US010162909B2

United States Patent
Inoue et al.

(10) Patent No.: US 10,162,909 B2
(45) Date of Patent: Dec. 25, 2018

(54) DEVICE PLACEMENT AUTOMATIC CALCULATION APPARATUS

(71) Applicant: Hitachi, Ltd., Chiyoda-ku, Tokyo (JP)

(72) Inventors: Reiko Inoue, Tokyo (JP); Takaharu Matsui, Tokyo (JP); Kenji Okuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 403 days.

(21) Appl. No.: 14/904,180

(22) PCT Filed: Oct. 10, 2014

(86) PCT No.: PCT/JP2014/077127
§ 371 (c)(1),
(2) Date: Jan. 11, 2016

(87) PCT Pub. No.: WO2015/068524
PCT Pub. Date: May 14, 2015

(65) Prior Publication Data
US 2016/0147910 A1 May 26, 2016

(30) Foreign Application Priority Data
Nov. 7, 2013 (JP) .................. 2013-230789

(51) Int. Cl.
G06F 3/00 (2006.01)
*G06F 17/50* (2006.01)
*G06F 17/15* (2006.01)

(52) U.S. Cl.
CPC .............. *G06F 17/50* (2013.01); *G06F 17/15* (2013.01); *G06F 2217/06* (2013.01)

(58) Field of Classification Search
CPC ..................................................... G06F 17/50
(Continued)

(56) References Cited

U.S. PATENT DOCUMENTS

| 8,560,997 B1* | 10/2013 | Yang ................... G06F 17/5072 716/122 |
| 2001/0017089 A1* | 8/2001 | Fujii ..................... B41F 17/00 101/484 |
| 2002/0032554 A1* | 3/2002 | Nakagawa ............ G06F 17/212 703/8 |

FOREIGN PATENT DOCUMENTS

| JP | 9-69171 A | 3/1997 |
| JP | 2000-200298 A | 7/2000 |
| JP | 2011-253269 A | 12/2011 |

OTHER PUBLICATIONS

L.P. Khoo, A genetic algorithm-based planning system for PCB component. placement (Year:1998).*

(Continued)

*Primary Examiner* — Lechi Truong
(74) *Attorney, Agent, or Firm* — Crowell & Moring LLP

(57) ABSTRACT

In a three-dimensional model design assistance system in which design rules are registered in advance, it is difficult to manually input all of an enormous number of device placement rules including the distances and directions between respective devices in a design. Information relating to the relative distances and relative directions between respective devices included in performance CAD data is extracted. With respect to each of the extracted relative distances and relative directions in a plurality of cases, a correlation with a performance requirement specification value, and a placement priority are calculated and held as device placement rules. At design time, requirement specifications are inputted, accessory devices are determined, and thereafter the devices are placed according to placement priorities on CAD on the basis of the device placement rules.

11 Claims, 9 Drawing Sheets

(58) Field of Classification Search
USPC .............................................................. 703/1
See application file for complete search history.

(56) References Cited

OTHER PUBLICATIONS

International Search Report (PCT/ISA/210) issued in PCT Application No. PCT/JP2014/077127 dated Nov. 4, 2014, with English translation (two (2) pages).

* cited by examiner

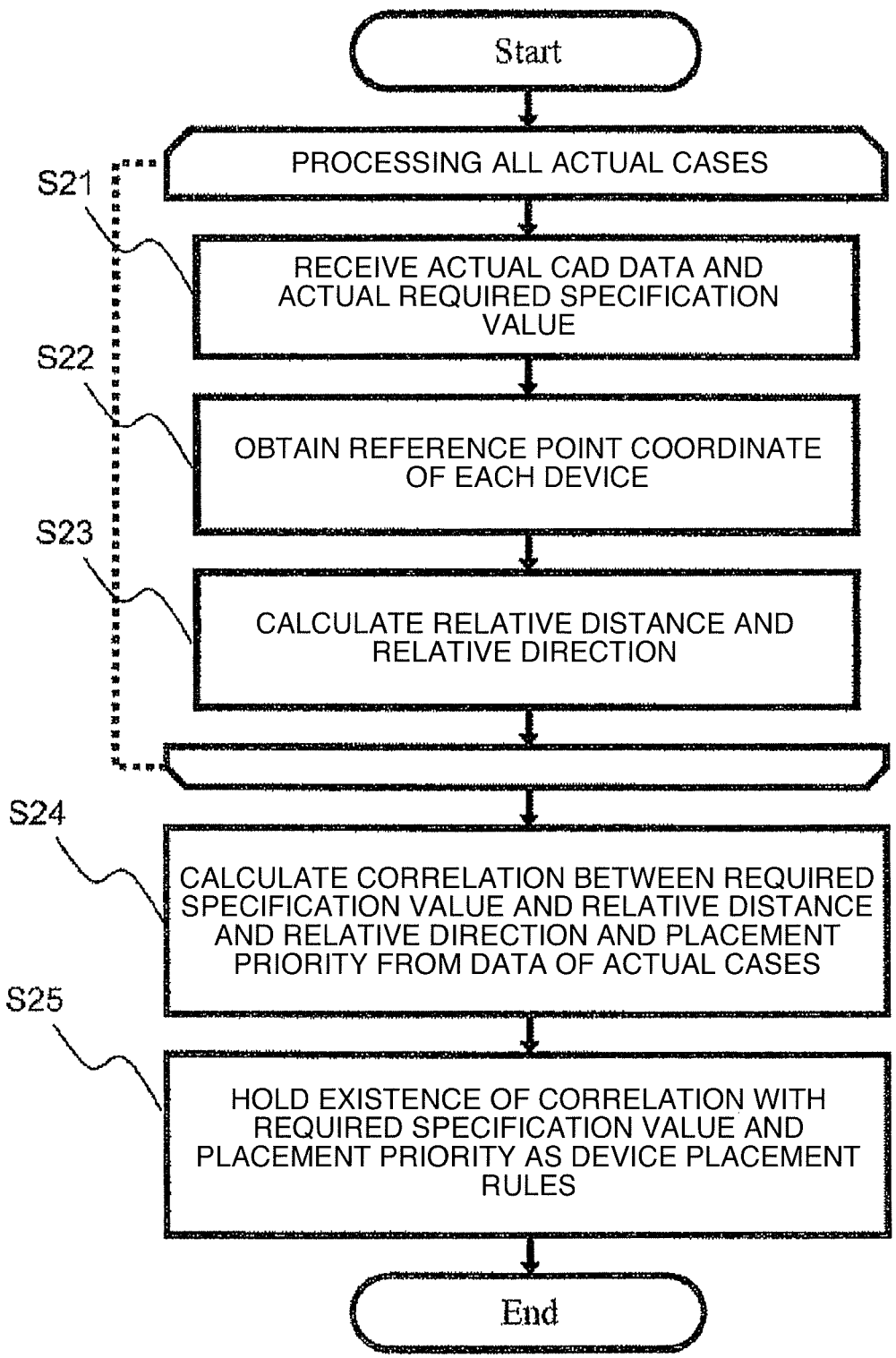

FIG. 3A

[ACTUAL CASE DATA]

| | | CASE NUMBER | | | |
|---|---|---|---|---|---|
| | | 1 | 2 | 3 | ... |
| REQUIRED SPECIFICATION VALUE | CAPACITY (MVA) | 325 | 500 | 420 | |
| | VOLTAGE (kV) | 1000 | 1200 | 800 | |
| RELATIVE DISTANCE AND RELATIVE DIRECTION BETWEEN DEVICES | DEVICE A - DEVICE B | RELATIVE DISTANCE (mm) | 1100 | 1700 | 1300 |
| | | RELATIVE DIRECTION (x,y,z) | (0.64,0.64,0.43) | (0.64,0.62,0.45) | (0.62,0.65,0.43) |
| | DEVICE A - DEVICE C | RELATIVE DISTANCE | 2480 | 2515 | 2505 |
| | | RELATIVE DIRECTION | (0.05,-0.10,0.89) | (-0.3,0.28,0.97) | (0.8,0.61,0.55) |
| | DEVICE A - DEVICE D | RELATIVE DISTANCE | 4410 | 1470 | 300 |
| | | RELATIVE DIRECTION | (1.00,0.00,0.00) | (0.15,-0.99,0.00) | (-0.95,-0.30,0.00) |
| | DEVICE A - DEVICE E | RELATIVE DISTANCE | 230 | 1300 | 1650 |
| | | RELATIVE DIRECTION | (0.18,0.33,0.59) | (0.72,-0.99,-0.93) | (-0.43,0.28,0.95) |

FIG. 3B

[DEVICE PLACEMENT RULES]

| | | KIND OF VALUE | EXISTENCE OF CORRELATION WITH REQUIRED SPECIFICATION VALUE | FIXED DISTANCE AND FIXED DIRECTION | REGRESSION FORMULA | PLACEMENT PRIORITY |
|---|---|---|---|---|---|---|
| DEVICE A - DEVICE B | RELATIVE DISTANCE (mm) | VARIATION DISTANCE | HAVING CORRELATION | — | RELATIVE DISTANCE = VOLUME * 3.4 - 40 | 1 |
| | RELATIVE DIRECTION (x,y,z) | FIXED DIRECTION | — | (0.64,0.64,0.43) | — | |
| DEVICE A - DEVICE C | RELATIVE DISTANCE | FIXED DISTANCE | — | 2500 | — | 2 |
| | RELATIVE DIRECTION | VARIATION DIRECTION | NO CORRELATION | — | — | |
| DEVICE A - DEVICE D | RELATIVE DISTANCE | VARIATION DISTANCE | NO CORRELATION | — | — | 2 |
| | RELATIVE DIRECTION | VARIATION DIRECTION | HAVING CORRELATION | — | ROTATION ANGLE θ = VOLTAGE * 0.15 - 120 | |
| DEVICE A - DEVICE E | RELATIVE DISTANCE | VARIATION DISTANCE | NO CORRELATION | — | — | 3 |
| | RELATIVE DIRECTION | VARIATION DIRECTION | NO CORRELATION | — | — | |

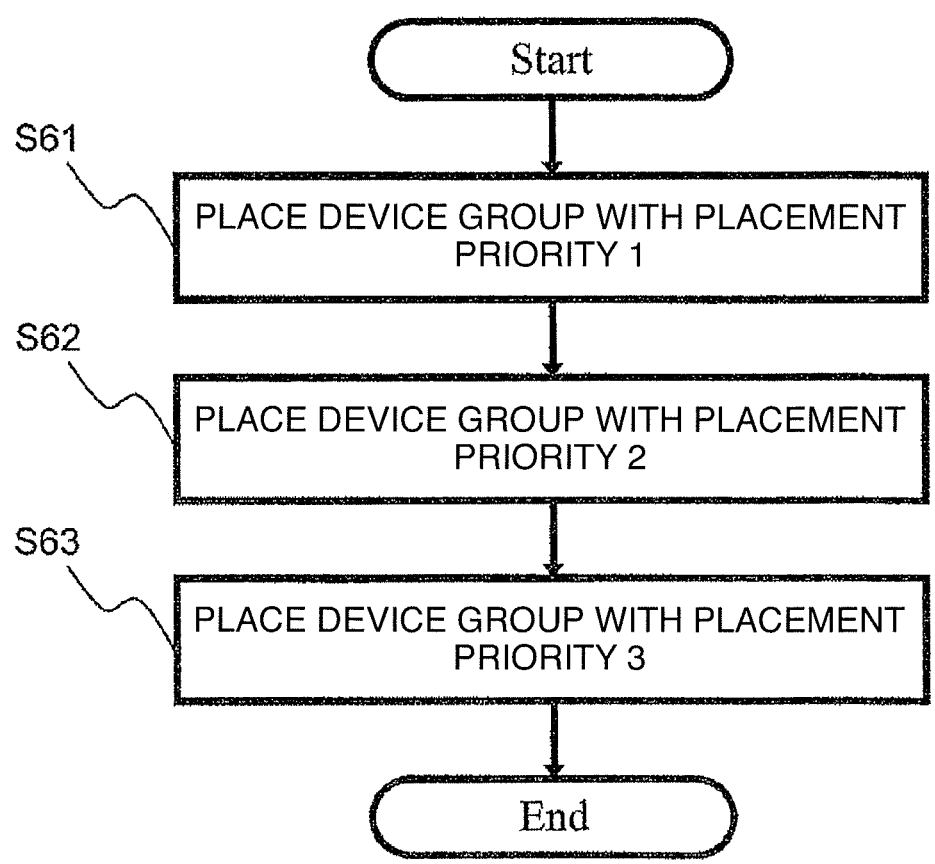

DEVICE PLACEMENT AUTOMATIC CALCULATION APPARATUS

TECHNICAL FIELD

The present invention relates to a device placement automatic calculation apparatus.

BACKGROUND ART

JP-A-2011-253269 (PATENT LITERATURE 1) is a background art of the present invention, PATENT LITERATURE 1 discloses that "A three-dimensional model design assistance system includes a design rule storage unit for registering a design rule using an attaching direction of a three-dimensional model and a three-dimensional model storage unit for registering a name, a kind, a direction, an assembly order, adjacency information, and the like of a component output from the three-dimensional model of a product. The three-dimensional model design assistance system checks the design rule by using the attaching direction of the three-dimensional model and informs an operator of whether the three-dimensional model violates the design rule" (refer to ABSTRACT).

CITATION LIST

Patent Literature

PATENT LITERATURE 1: JP-A-2011-253269

SUMMARY OF INVENTION

Technical Problem

PATENT LITERATURE 1 discloses a system for assisting a design based on a rule stored in a design rule storage unit. However, in a three-dimensional model design assistance system in which design rules have been previously registered, it is difficult to manually input all the enormous number of device placement rules such as a distance and direction between respective devices in a design.

Therefore, the present invention provides an apparatus which automatically calculates a device placement rule from computer aided design (CAD) data of actual cases.

Solution to Problem

To solve the above-described problem, the present invention is configured to: extract a relative distance and a relative direction of each device from the actual CAD data; determine whether a required specification value in the actual specification data and the extracted relative distance or relative direction have a correlation in a plurality of cases in the past; and extract a rule between the devices regarding whether the required specification value in the actual specification data and the extracted relative distance or the relative direction of each device have the correlation.

Advantageous Effects of Invention

The present invention has an effect to reduce design man-hours.

BRIEF DESCRIPTION OF DRAWINGS

FIG. 2 is a flowchart of device placement rule extraction processing.

FIGS. 3A and 3B are exemplary tables of actual case data and a device placement rule.

FIG. 6 is a flowchart of device placement processing.

DESCRIPTION OF EMBODIMENTS

An embodiment of the present invention will be described below with reference to the drawings.

First Embodiment

Figure 1:
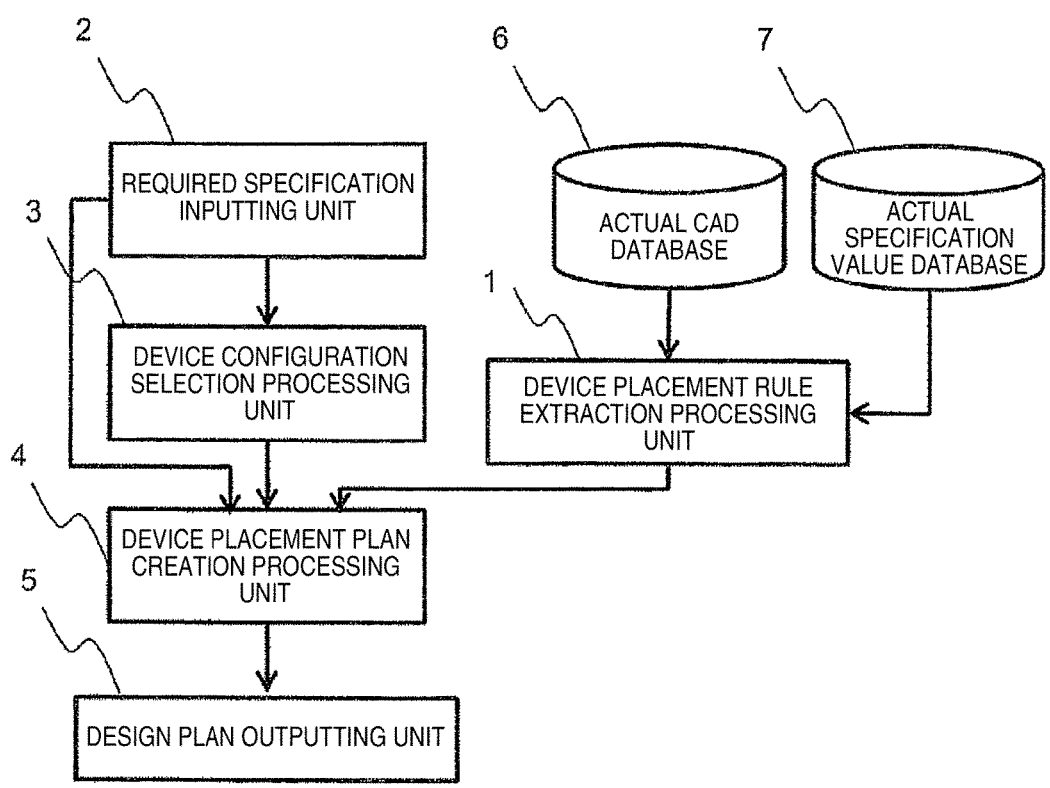
FIG. 1 is a function configuration diagram according to an embodiment of a device placement automatic calculation apparatus of the present invention.

FIG. 1 is a function configuration diagram according to an embodiment of the present invention. The present invention includes a device placement rule extraction processing unit 1 which extracts a device placement rule from actual case GAD data in the past held by an actual CAD database 6 and a required specification value of the same actual case held by an actual specification value database 7. When a new design plan is created, the required specification value is input from a required specification inputting unit 2, and a device configuration selection processing unit 3 selects a device which satisfies the required specification. A device placement plan creation processing unit 4 creates a placement plan based on the required specification value input by the required specification inputting unit 2 and the device placement rule which has been extracted by the device placement rule extraction processing unit 1 and corresponds to configuration of devices. Finally, a design plan outputting unit 5 outputs a design plan from the created placement plan.

Each processing will be described below.

First, the processing by the device placement rule extraction processing unit 1 will be described with reference to FIG. 2.

The device placement rule extraction processing unit 1 obtains the CAD data and the required specification value of the actual case in the past (S21), the actual CAD database 6 and the actual specification value database 7 respectively hold the CAD data and the required specification value.

Next, a reference point coordinate of each device included in the CAD data is obtained (S22). As the reference point, it is preferable to use the center of gravity of each device, a design reference point of each device, and the like.

After the reference point coordinate of each device has been extracted, a relative distance and a relative direction between the devices are calculated (S23). Here, the relative distances and the relative directions of all the combinations of two devices which have been optionally selected from among a plurality of devices in the actual case are calculated. As processing before the calculation, in order to reduce a calculation amount, filtering can be performed such that a device which has small effect on the device placement and has the size smaller than a predetermined value is not calculated. Also, a combination of devices which are normally used as a unit can be assumed as a single device.

Here, a distance between the reference point coordinates of the respective devices is defined as the "relative distance". Also, a unit vector in a direction between the devices is defined as the "relative direction". The unit vector has the reference point coordinate of one device as a start point and the reference point coordinate of another device as an end point.

Figure 9:
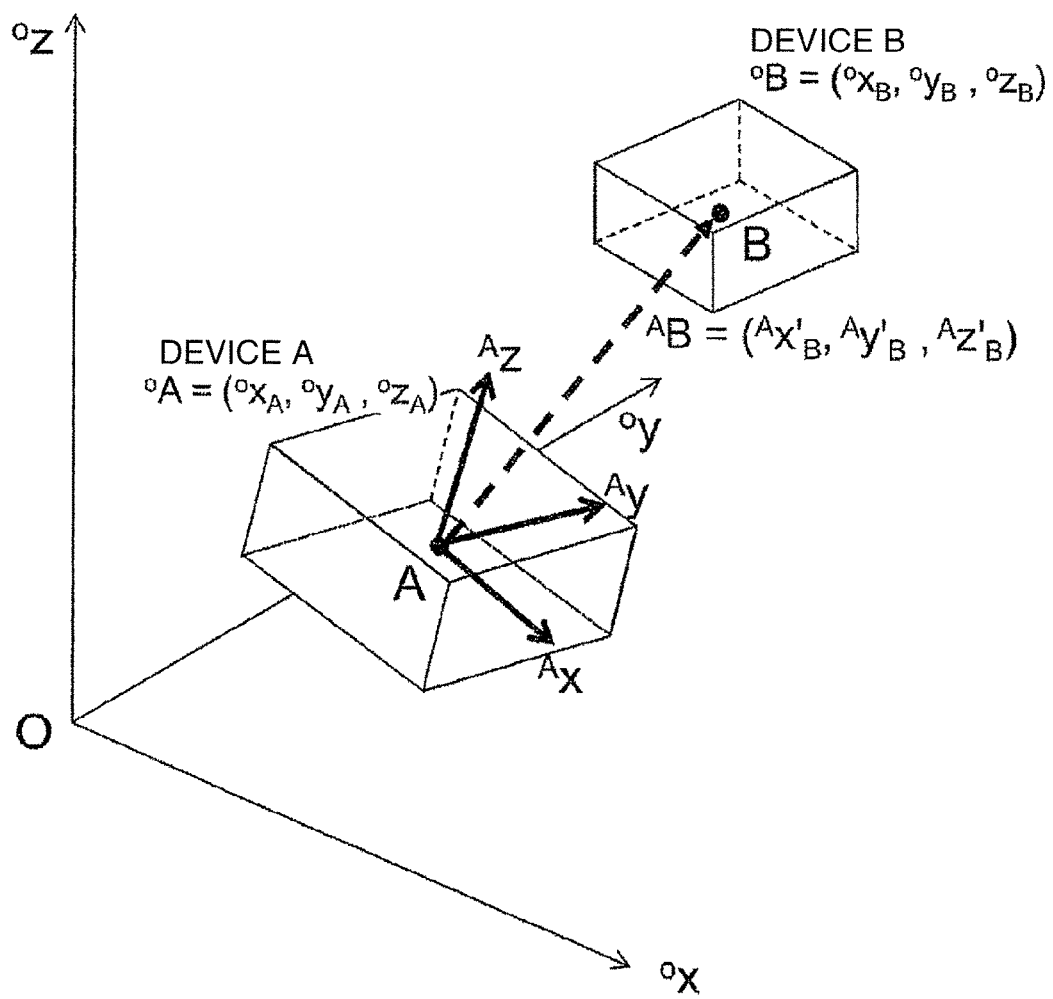
FIG. 9 is a diagram to describe a relative direction.

The relative direction will be described, with reference to FIG. 9. The relative direction can be expressed on a coordinate system of one device. For example, a global coordinate system is expressed as O ($^{o}x$, $^{o}y$, $^{o}z$). At this time, it is assumed that a device A and a device B exist on the global coordinate system. It is assumed that a global coordinate of the device A be $^{o}A=(^{o}x_A, ^{o}y_A, ^{o}z_A)$ and a global coordinate of the device A be $^{o}B=(^{o}x_B, ^{o}y_B, ^{o}z_B)$. Here, when an A coordinate system ($^{A}x$, $^{A}y$, $^{A}z$) having the reference point of the device A as a reference is newly defined, a relative coordinate of the device 13 on the A coordinate system ($^{A}x$, $^{A}y$, $^{A}z$) can be expressed as $^{A}B=(^{A}x'_B, ^{A}y'_B, ^{A}z'_B)$. The relative coordinate can be calculated by assuming that $^{A}B=^{o}B-^{o}A$. The unit vector in the direction of the relative coordinate is the relative direction.

The process from S21 to S23 is repeated by the number of the actual cases. Exemplary data of the actual cases is illustrated in FIG. 3(a). A case number 311, a required specification value 312, a relative distance 313, and a relative direction 314 are held for each actual case.

After the relative distances and the relative directions of the actual cases have been accumulated, a correlation between the required specification value and the relative distance, a correlation between the required specification value and the relative direction, and a placement priority are calculated (S24). The process S24 will be described in detail below.

Finally, the correlation between the required specification value and the relative distance, the correlation between the required specification value and the relative direction, and the placement priority which have been calculated in S24 are held as a device placement rule (S25). Exemplary device placement rules are illustrated in FIG. 3(b). In the device placement rule, a kind of value 321, existence of correlation with the required specification value 322, a fixed distance and fixed direction 323, a regression formula 324, and a placement priority 325 are held.

Figure 4:
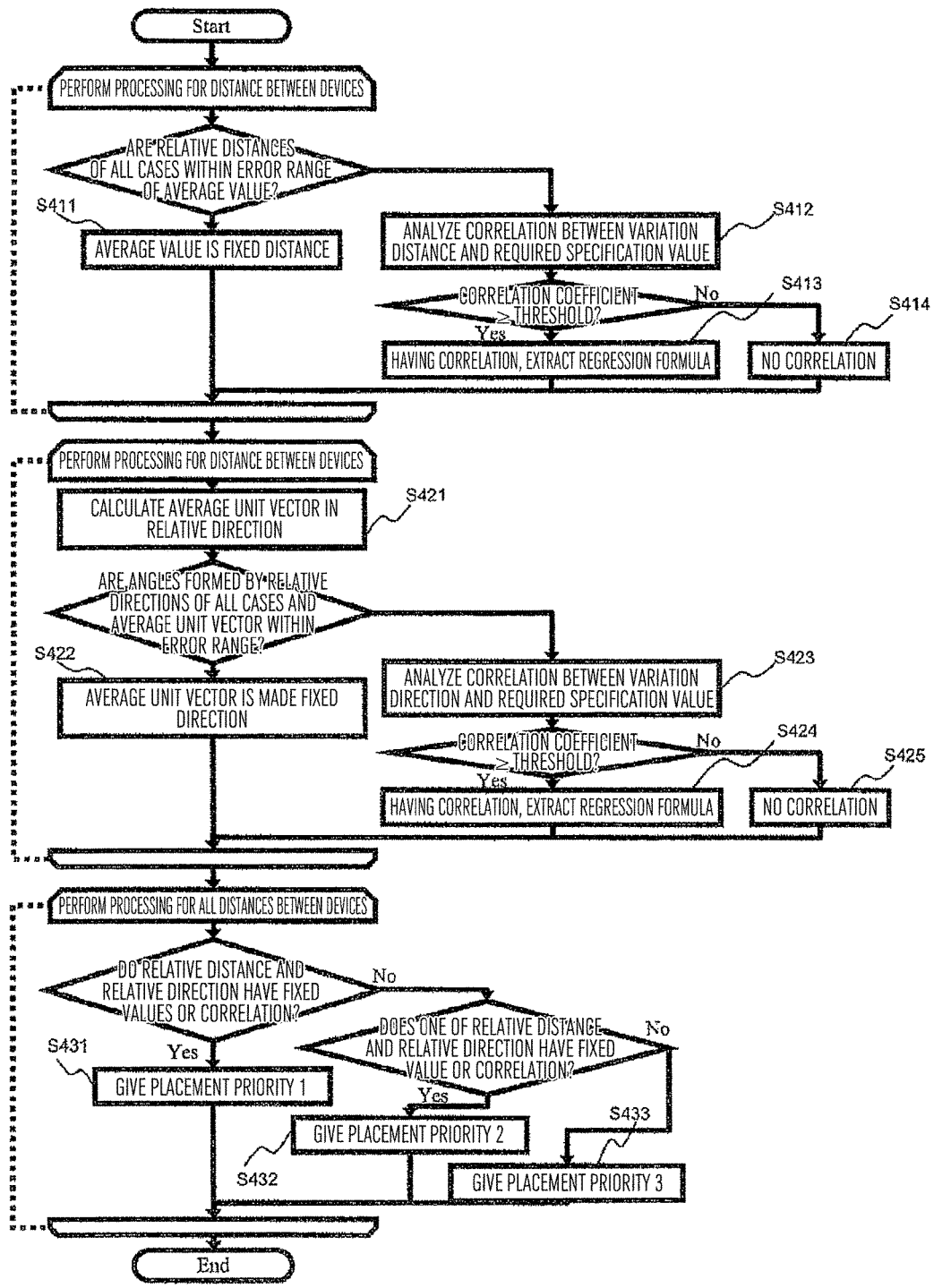
FIG. 4 is a flowchart of detailed processing for extracting the device placement rule.

Here, the process S24 for calculating the correlation between the required specification value and the relative distance, the correlation between the required specification value and the relative direction, and the placement priority will be described in detail with reference to FIG. 4.

First, regarding the relative distance, following processing will be performed. Here, in a case where the relative distance is not changed even when the required specification value is changed, the relative distance is assumed as a "fixed distance". On the other hand, in a case where the relative distance is changed when the required specification value is changed, the relative distance is assumed as a "variation distance".

First, it is determined whether the relative distance between the selected devices is the fixed distance or the variation distance. An average value of the relative distances between the selected devices is obtained. When the relative distances of all the actual cases are within an error range of the average value, it is determined that the relative distance between the devices is the fixed distance. Then, the average value is held in the fixed distance and fixed direction 323 while assuming the kind of value 321 as the "fixed distance" (S411). In the example in FIG. 3(a), when an allowable error of the relative distance between a device A and a device C is equal to or less than 20 [mm], the relative distance is 2500±20 [deg] regardless of the required specification value.

Therefore, it can be determined that the relative distance between the devices A and C is the fixed distance of 2500 [deg]. The allowable error can be set by using a percentage, a value or the like.

When the relative distance is not within the error range of the average value, it is determined that the relative distance between the devices is the variation distance. While assuming the kind of value 321 as the "variation distance", the correlation between the variation distance and the required specification value is analyzed (S412).

When there is a required specification value having a correlation coefficient which is equal to or larger than a threshold for the relative distance, it is determined that the relative distance and the required specification value have a correlation. The existence of correlation with the required specification value 322 is "having correlation". In addition, a regression formula is obtained by performing regression analysis by using the required specification value as an explanatory variable and the relative distance as an explained variable, and the obtained regression formula is held in the regression formula 324 (S413). The threshold of the correlation coefficient can be set by using a percentage or a value. In the example in FIG. 3(a), correlation coefficient with a relative distance between the devices A and B and a volume in the required specification value of "Capacity" is 0.97, and accordingly, it is determined that the relative distance between the devices A and B have the correlation with the "Capacity". By the regression analysis, a regression formula having an intercept of −40 and a regression coefficient of 3.4 can be obtained.

When the correlation coefficients with all the required specification values are smaller than the threshold, it is determined that the relative distance and the required specification value have no correlation. The existence of correlation with the required specification value 322 is "no correlation" (S414). Correlation analysis processing of the relative distance from S411 to S414 is performed for each distance between the devices.

Next, following process will be performed to the relative direction. Here, in a case where the relative direction is not changed even when the required specification value is changed, the relative direction is assumed as the "fixed direction". On the other hand, in a case where the relative direction is changed when the required specification value is changed, the relative distance is assumed as a "variation direction".

First, an average unit vector is calculated which will be criteria of the fixed direction and the variation direction (S421). At this time, a composite vector in which the relative directions of all the actual cases have been synthesized is calculated. Then, extract the unit vector of the composite vector as the average unit vector.

Next, angles formed by the relative directions of all the actual cases and the average unit vector are obtained. When the formed angles of all the actual cases are within the error range of the average unit vector, it is determined that the relative direction between the devices is the fixed direction. In this case, the kind of value 321 is the "fixed direction". In addition to the case, the average unit vector is held in the fixed distance and fixed direction 323 (S422). In the example in FIG. 3(a), when the error range is within 5 [deg], all the relative directions between the devices A and B are within the error range. Therefore, it is determined that the relative direction is the fixed direction, and (0.64, 0.64, 0.43) of the average unit vector is held as fixed values.

When the angle formed by the relative direction and the average unit vector is not within the error range, it is determined that the relative direction between the devices is the variation direction. The kind of value 321 is the "variation direction", and the correlation between the variation direction and the required specification value is analyzed (S423).

When there is a required specification value having a correlation coefficient equal to or more than the threshold, the regression analysis is performed as assuming that the existence of correlation with the required specification value 322 is "having correlation". The regression formula 324 holds the regression formula (S424). In the example in FIG. 3(a), a correlation coefficient between the relative direction between the devices A and D and a voltage regarding a rotation angle θ around the x axis is 1.00, a regression formula having an intercept of −120 and a regression coefficient of 0.15 can be obtained.

When the correlation coefficients with all the required specification values are smaller than the threshold, it is determined that the relative direction and the required specification value have no correlation. The existence of correlation with the required specification value 322 is "no correlation" (S425).

The correlation analysis processing of the relative direction from S421 to S425 is performed for each distance between the devices. The placement priority is determined after the correlation analysis processing of the relative distance and the relative direction for all the distances between the devices has been terminated.

When both of kind of value 321 of the relative distance and the relative direction of the devices are the "fixed distance" and the "fixed direction" or the value 322 is "having correlation", a placement priority 1 is given between the devices (S431). In the example in FIG. 3(b), regarding the devices A and B, since the existence of correlation with the required specification value 322 of the relative distance is "having correlation" and the kind of value 321 of the relative direction is the "fixed direction", the placement priority 1 is given.

Next, when one of the kind of value 321 of relative distance and the relative direction of each device is "fixed distance" or "fixed direction", or one value 322 is "having correlation" and another value 322 is "no correlation", a placement priority 2 is given to the device (S432). In the example, in FIG. 3(h), regarding the devices A and C, since the kind of value 321 of the relative distance is the "fixed distance" and the existence of correlation with the required specification value 322 of the relative direction is "no correlation", the placement priority 2 is given. Also, regarding the devices A and D, since the existence of correlation with the required specification value 322 of the relative distance is "no correlation" and the existence of correlation with the required specification value 322 of the relative direction is "having correlation", the placement priority 2 is given.

Finally, when both of the kind of value 322 of the relative distance and the relative direction of each device is "no correlation", a placement priority 3 is given to the device (S433). In the example in FIG. 3(b), regarding the devices A and E, since the existence of correlation with the required specification value 322 of the relative distance and the relative direction is "no correlation", the placement priority 3 is given.

Processing for determining the placement priority from S431 to S433 is performed to all the distances between the devices.

As described above, according to the flowchart illustrated in FIG. 2, an enormous number of the device placement rules in the design such as the relative distance and the relative direction of each device can be automatically calculated.

From S412 to S414 and from S423 to S425, a plurality of thresholds of the correlation coefficients may be used, and the placement priority may be classified into four or more stages.

Figure 5:
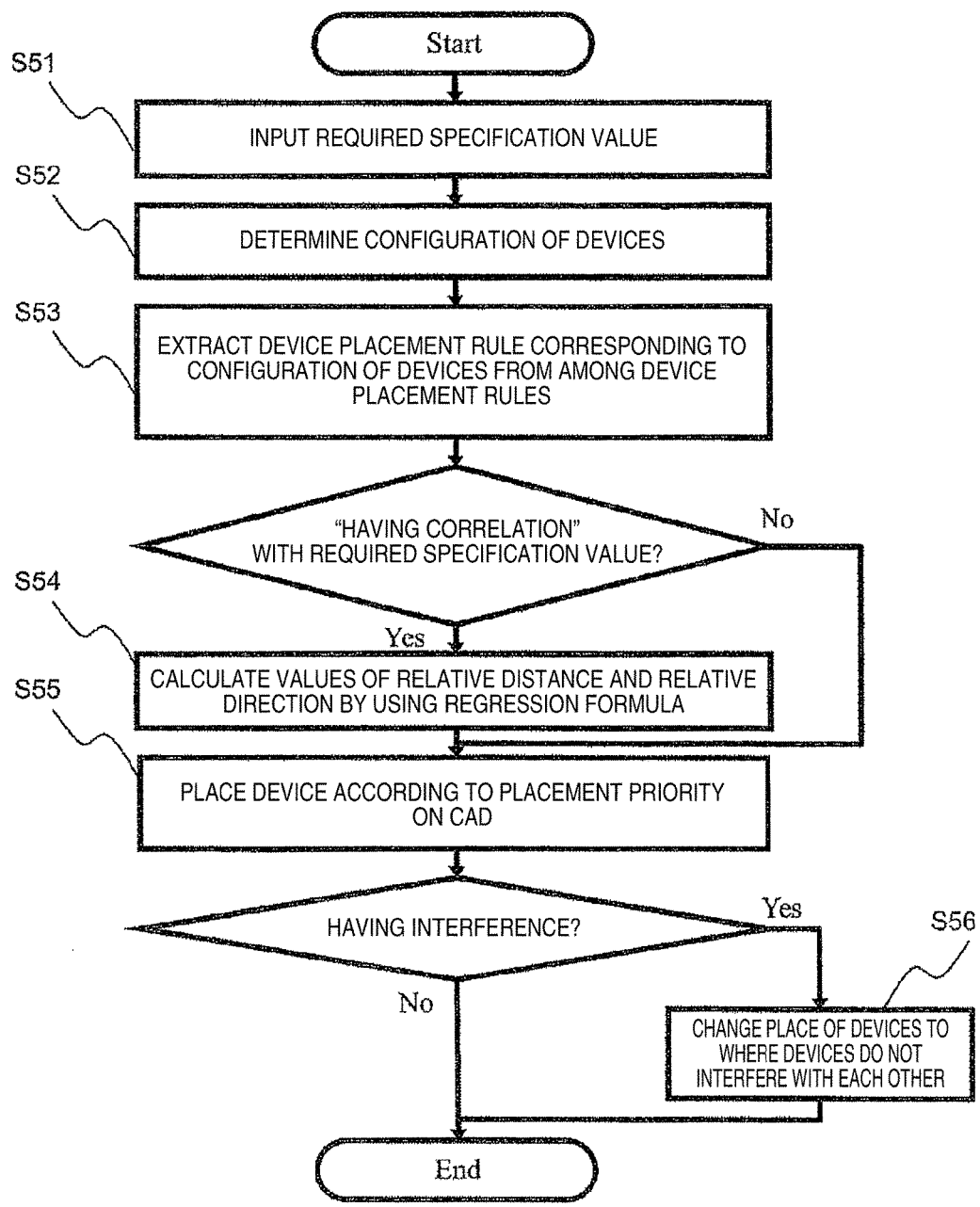
FIG. 5 is a flowchart of new design plan creation processing.

Next, processing of the required specification value inputting unit 2, the device configuration selection processing unit 3, and the placement plan creation processing unit 4 at the time of creating a new design plan will be described with reference to FIG. 5.

First, the required specification value inputting unit 2 inputs a required specification value for a new design (S51).

Next, the device configuration selection processing unit 3 selects configuration of devices which satisfies the required specification value. It is preferable that the configuration of devices be selected based on the required specification value according to a method disclosed in JP-A-2006-155601 and the like.

After the configuration of devices has been selected, a device placement rule corresponding to the configuration of devices is extracted from among the device placement rules held in S25 (S53). At this time, when the value 321 is the "variation distance" or the "variation direction" and the value 322 is "having correlation", a relative distance and a relative direction for the required specification value are calculated by substituting the required specification value into the regression formula 324 (S54). When the kind of value 321 of the extracted device placement rule is the "fixed distance" or the "fixed direction", a value of the fixed distance and fixed direction 323 held in the device placement rule is used. After that, the devices are placed on the CAD according to the placement priority (S55). The processing in S55 will be described below.

After all the devices have been placed on the CAD, interference between the devices is determined. When the devices interfere with each other, the place of the devices to where the devices do not interfere with each other is changed (S56). The device placement may be manually changed, and also, may be changed by an automated procedure.

Figure 7A:
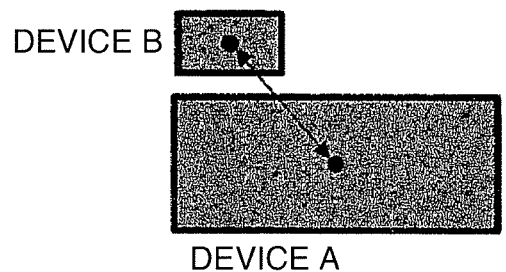
FIGS. 7A, 7B, and 7C are exemplary device arrangements.
Figure 7B:
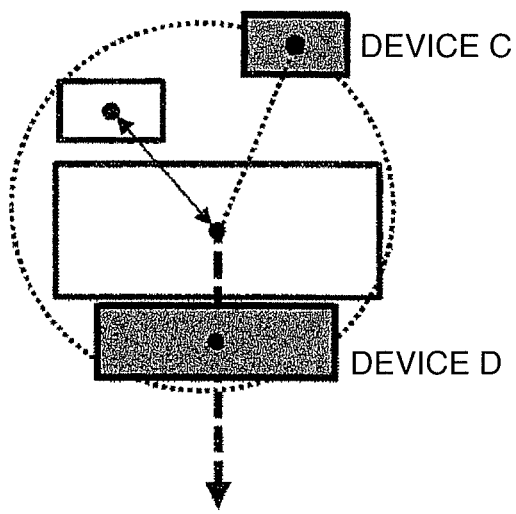
Figure 7C:
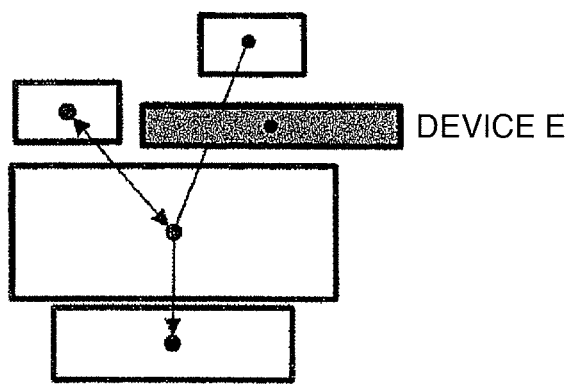

Here, processing in S55 for placing the device on the CAD according to the placement priority will be described with reference to FIGS. 6 and 7.

First, as illustrated in the flowchart in FIG. 6, the devices with the placement priority 1 are placed (S61). An exemplary placement of the devices with the placement priority 1 is illustrated in FIG. 7(a). Here, with reference to the example in FIG. 3(b), it is assumed that the placement priority 1 be given to the devices A and B. The relative distance and the relative direction are uniquely determined as a fixed value or a value calculated from the regression formula between the devices with the placement priority 1. Accordingly, a relative placement of the devices A and B can be uniquely determined.

Next, the devices with the placement priority 2 are placed according to the flowchart in FIG. 6 (S62). An exemplary placement of the devices with the placement priority 1 is illustrated in FIG. 7(b). Here, with reference to the example in FIG. 3(b), it is assumed that the placement priority 2 be given to the devices A and C and the devices A and D. Here, regarding the devices A and C, the relative distance is the fixed distance and the relative direction is no correlation. Then, it is determined that the device C is placed on a spherical surface having the reference point coordinate of the device A as the center and the relative distance as the radius. It is preferable that the device C be placed at a position, where the device C does not interfere with other device on the spherical surface. Also, regarding the devices A and D, the relative distance is no correlation, and the relative direction is a value calculated according to the regression formula. Then, it is determined that the device D is placed on a half line in the relative direction having the coordinate of the device A as a start point. It is preferable that the device D be placed at a position where the device D does not interfere with the other device on the half line.

Finally, the devices with the placement priority 3 are placed according to the flowchart in FIG. 6 (S63). An exemplary placement of the devices with the placement priority 3 is illustrated in FIG. 7(*c*). Here, with reference to the example in FIG. 3(*b*), it is assumed that the placement priority 3 for all the devices is given to the device E. The device with the placement priority 3 does not have a value which has been determined as the relative distance and the relative direction with other devices. Therefore, it is preferable that the device with the placement priority 3 be placed at an arbitrary position.

As described above, according to the flowchart in FIG. 5, the device placement can be automatically determined based on the device placement rule calculated by the device placement rule extraction processing unit 1.

Figure 8:
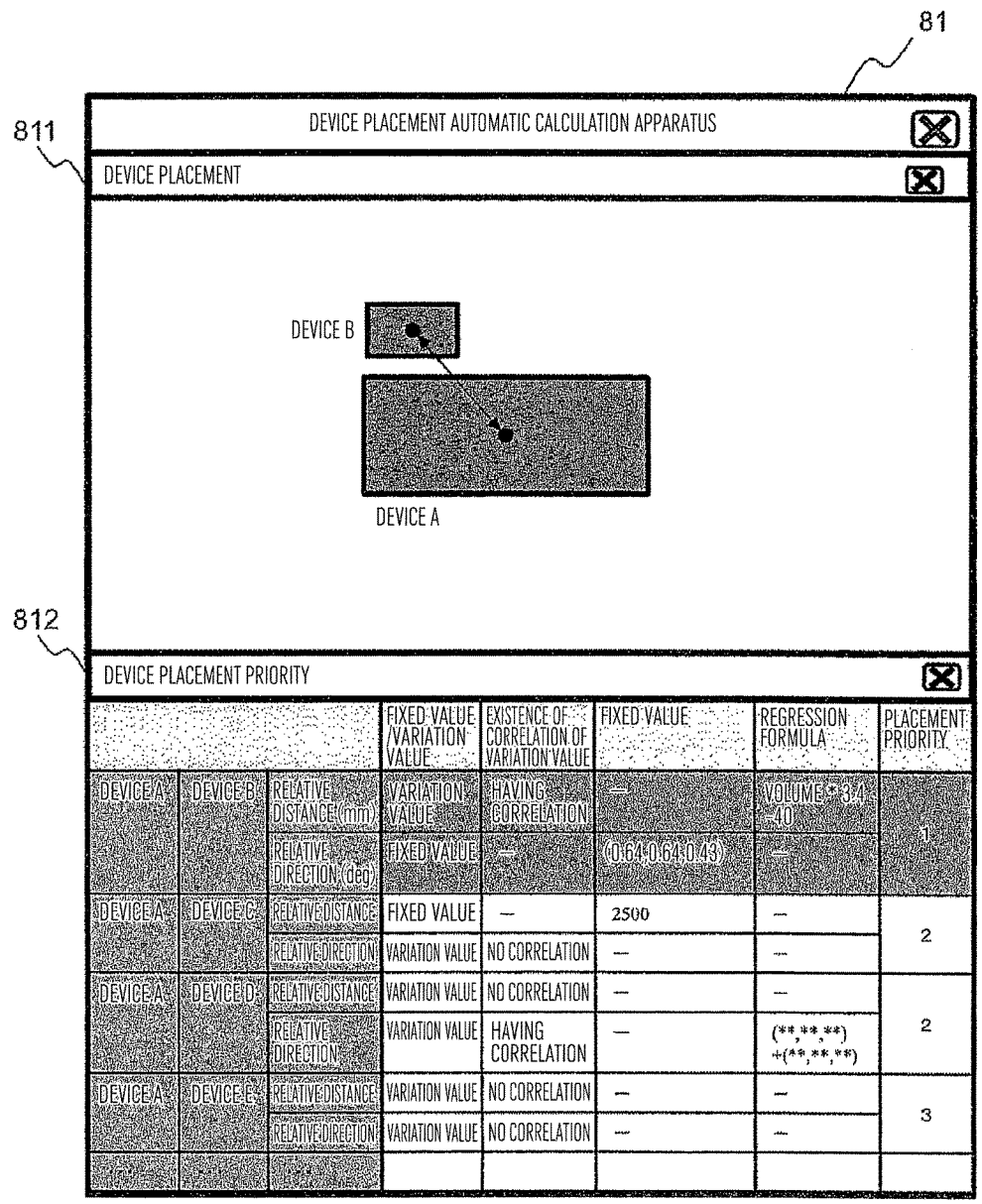
FIG. 8 is an exemplary screen display.

An exemplary screen display of a device placement automatic calculation apparatus is illustrated in FIG. 8. For example, a device placement automatic calculation apparatus screen 81 includes a device placement displaying screen 811, a device placement priority 812 and the like. A device placement created by the device placement plan creation processing unit 4 is displayed in the device placement displaying screen. The device placement rule extracted by the device placement rule extraction processing unit 1 is displayed in the device placement priority 812.

The present invention is not limited to the embodiment and includes various modifications. For example, the embodiment is described in detail for easy understanding of the present invention and is not necessarily limited to the one which includes all the components described above. Also, a part of the components of one embodiment can be replaced with that of the other embodiment, and the components of the other embodiment can be added to the component of one embodiment. Also, other components can be added to a part of the components of the embodiment, and a part of the components can be deleted or replaced.

Also, a part of or all of the configuration, function, processor, and processing unit may be realized by hardware, for example, by designing them in an integrated circuit. Also, the configuration, the function, and the like described above may be realized by software by interpreting and executing a program, which realizes each function, by the processor. Information such as the program for realizing each function, a table, and a file can be stored in a storage device such as a memory, a hard disk, and a solid state drive (SSD), or a storage media such as an IC card, a SD card, and a DVD Also, a control line and an information line which are considered to be necessary for the description are illustrated. All the control lines and information lines in the product are not necessarily illustrated. It may be considered that almost all components are connected with each other in practice.

The invention claimed is:
1. A device placement automatic calculation method for assisting a placement design of multiple devices based on a required specification according to data accumulated in a database, comprising:
   obtaining actual CAD (computer aided design) data including information on a position of each device in at least two cases in the past;
   obtaining actual specification data in the at least two cases in the past;
   extracting a relative distance and a relative direction of each device from the actual CAD data;
   determining whether a required specification value in the actual specification data and the extracted relative distance or relative direction have a correlation from multiple cases in the past; extracting a rule between the devices regarding whether the required specification value in the actual specification data and the extracted relative distance or the relative direction of each device have the correlation;
   determining a placement priority between the devices on the basis of the identified correlation between the required specification value in the actual specification data and the extracted relative distance or the relative direction of each device;
   receiving an input of a required specification value;
   determining a device which satisfies the required specification value;
   extracting a rule between the devices relating to the device which satisfies the required specification value;
   calculating a value the relative distance or relative direction between the determined devices based on the rule between the devices; and
   placing the device based on the calculated value of the relative distance or relative direction on a CAD.

2. The device placement automatic calculation method according to claim 1, wherein
   when the required specification value and the relative distance or the relative direction between the devices have the correlation, the devices is placed on the CAD prior to the placement of the devices having no correlation.

3. The device placement automatic calculation method according to claim 1, wherein
   the placement of the devices is determined on the CAD in order of following three cases, i.e., a case where the required specification value and the relative distance and the relative direction between the devices have the correlation, a case where the required specification value and one of the relative distance and the relative direction between the devices have the correlation, and a case where the required specification value and the relative distance and the relative direction between the devices have no correlation.

4. The device placement automatic calculation method according to claim 1, wherein
   a coordinate of a reference point of each device included in CAD data is obtained, and the relative distance and the relative direction are calculated.

5. The device placement automatic calculation method according to claim 1, wherein
   when the placed devices are interfered with each other, the placement is modified so that the devices do not interfere with each other.

6. A device placement automatic calculation apparatus for assisting a placement design of multiple devices based on a required specification according to data accumulated in a database, comprising:
   a storage device including an actual CAD (computer aided design) database configured to store actual CAD data including information on a position of each device in at least two cases in the past, and an actual specification value database configured to store actual specification data in the at least two cases in the past; and a processor configured to execute a device placement rule extracting unit to extract a relative distance and a relative direction of each device from the actual CAD data, to determine whether a required specification value in the actual specification data and the extracted relative distance or relative direction have a correlation in multiple cases in the past, and to extract a rule between the devices regarding whether the required specification value in the actual specification data and the extracted relative distance or the relative direction of each device have the correlation, wherein a placement priority between the devices is determined on the basis of the identified correlation between the required specification value in the actual specification data and the extracted relative distance or the relative direction of each device, and wherein the processor is also configured to:

receive an input of a required specification value;

determine a device which satisfies the required specification value;

extract a rule between the devices relating to the device which satisfies the required specification value;

calculate a value the relative distance or relative direction between the determined devices based on the rule between the devices; and place the device based on the calculated value of the relative distance or relative direction on a CAD.

7. The device placement automatic calculation apparatus according to claim 6, wherein the processor is further configured to execute:

a required specification input unit to receive an input of the required specification value;

a device configuration selection processing unit to determine a device which satisfies the required specification value; and a device placement plan creation processing unit to extract the rule between the devices relating to the device which satisfies the required specification value, to calculate the value of the relative distance or relative direction between the determined devices based on the rule between the devices, and to place the device based on the calculated value of the relative distance or relative direction on a CAD.

8. The device placement automatic calculation apparatus according to claim 7, wherein when the required specification value and the relative distance or the relative direction between the devices have the correlation, the device placement plan creation processing unit determines the placement of the devices on the CAD prior to the device having no correlation.

9. The device placement automatic calculation apparatus according to claim 7, wherein the device placement plan creation processing unit determines the placement of the devices on the CAD in an order of three cases, i.e., a case where the required specification value and the relative distance and the relative direction between the devices have the correlation, a case where the required specification value and one of the relative distance and the relative direction between the devices have the correlation, and a case where the required specification value and the relative distance and the relative direction between the devices have no correlation.

10. The device placement automatic calculation apparatus according to claim 7, wherein when the placed devices are interfered with each other, the device placement plan creation processing unit modifies the placement so that the devices do not interfere with each other.

11. The device placement automatic calculation apparatus according to claim 6, wherein the device placement rule extracting unit obtains a reference point coordinate of each device included in CAD data and calculates the relative distance and the relative direction.

* * * * *